H. W. SHONNARD.
ELECTRIC MOTOR GYROSCOPE.
APPLICATION FILED NOV. 3, 1915.

1,192,468.

Patented July 25, 1916.
3 SHEETS—SHEET 1.

WITNESSES

INVENTOR
Harold W. Shonnard
by Christy and Christy
his attorneys

H. W. SHONNARD.
ELECTRIC MOTOR GYROSCOPE.
APPLICATION FILED NOV. 3, 1915.
1,192,468.
Patented July 25, 1916.
3 SHEETS—SHEET 3.
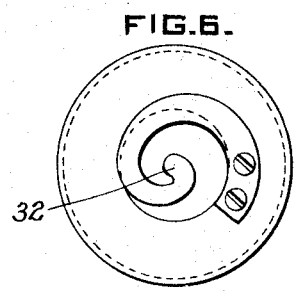
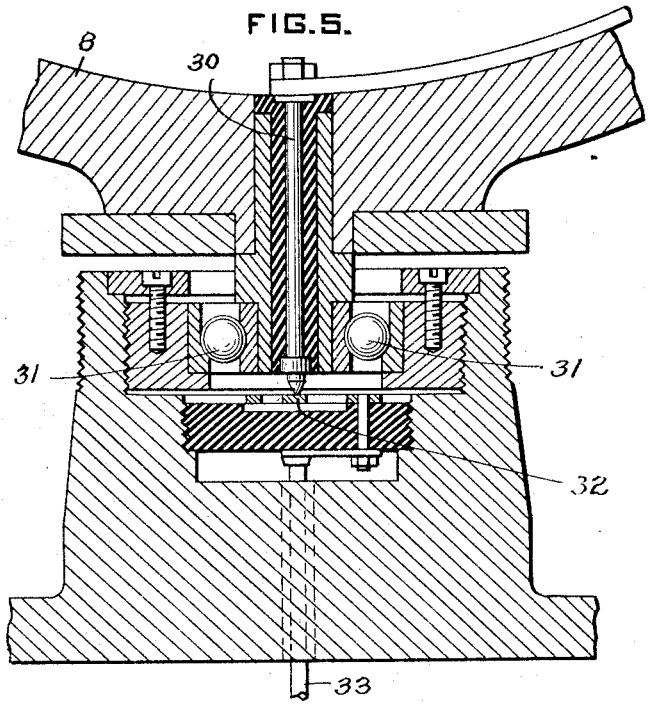
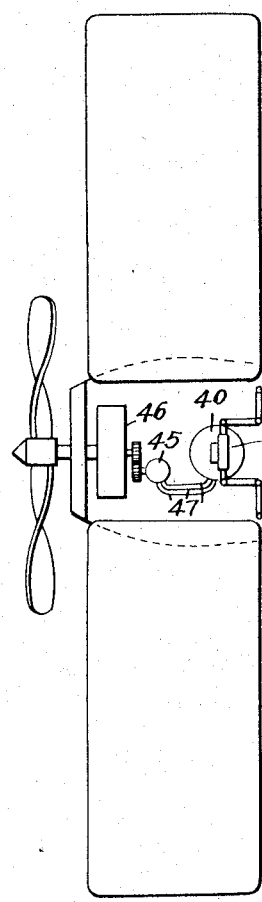
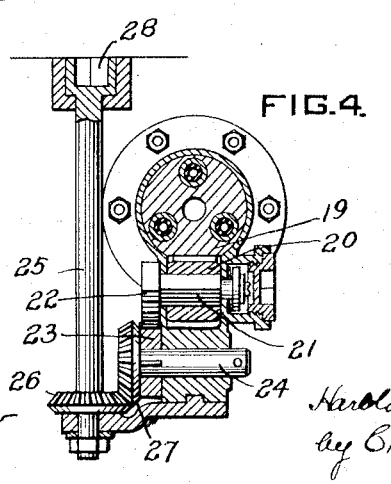
WITNESSES
Paul M. Critchlow
Francis J. Donarson
INVENTOR
Harold W. Shonnard
by Christy and Christy
his attorneys

UNITED STATES PATENT OFFICE.

HAROLD W. SHONNARD, OF UPPER MONTCLAIR, NEW JERSEY, ASSIGNOR TO CRUCIBLE STEEL COMPANY OF AMERICA, OF PITTSBURGH, PENNSYLVANIA, A CORPORATION OF NEW JERSEY.

ELECTRIC-MOTOR GYROSCOPE.

1,192,468.   Specification of Letters Patent.   Patented July 25, 1916.

Application filed November 3, 1915. Serial No. 59,360.

*To all whom it may concern:*

Be it known that I, HAROLD W. SHONNARD, residing at Upper Montclair, in the county of Essex and State of New Jersey, a citizen of the United States, have invented or discovered certain new and useful Improvements in Electric-Motor Gyroscopes, of which improvements the following is a specification.

This application is, as far as there is common subject-matter, a continuation in part of my pending application for gyroscopically controlled torpedoes, filed April 3, 1915, Serial No. 18,962.

The invention described herein relates to the construction and operation of electric motor gyroscopes regardless of the specific purpose for which they may be employed.

The object of my invention is, first, to provide an electric motor gyroscope which may be quickly spun to the proper speed without liability of injuring the gimbal or rotor bearings by the electric spinning current, and, secondly, to provide a gyroscope of the character described which may be continuously spun without liability of causing it to precess by reason of the electrical connections to a motor element.

In the accompanying sheets of drawings, which form part of my specification, I have illustrated the preferred embodiment of my invention.

Figure 1:
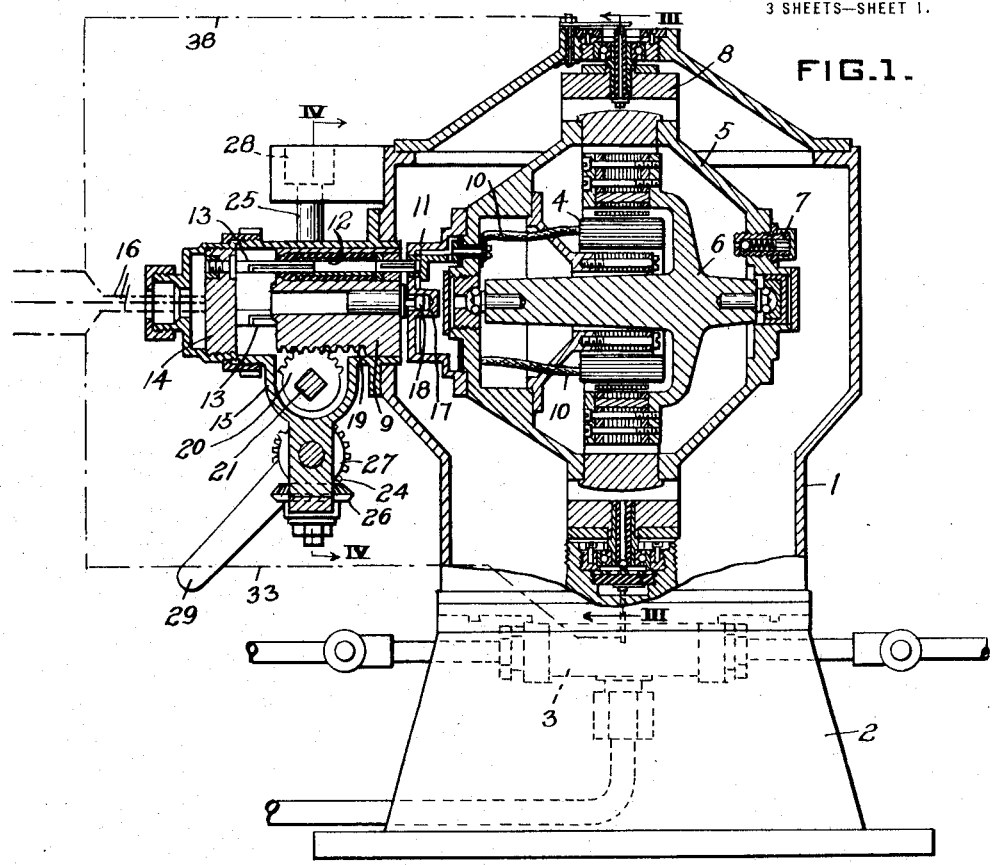
Figure 2:
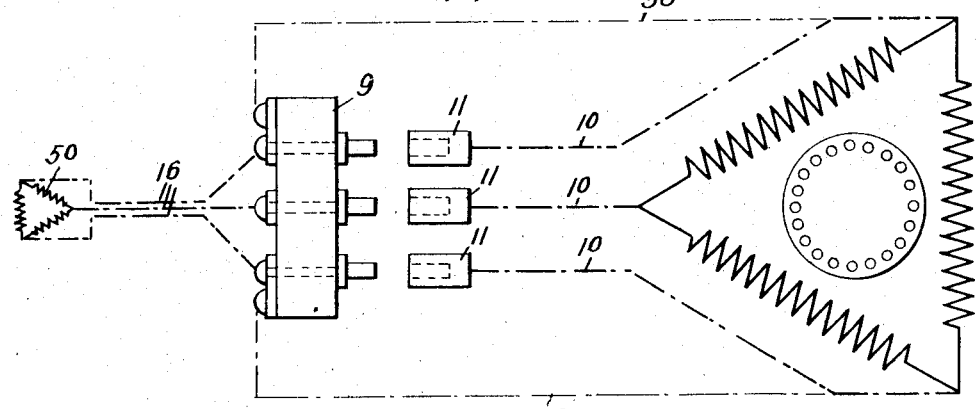
Figure 3:
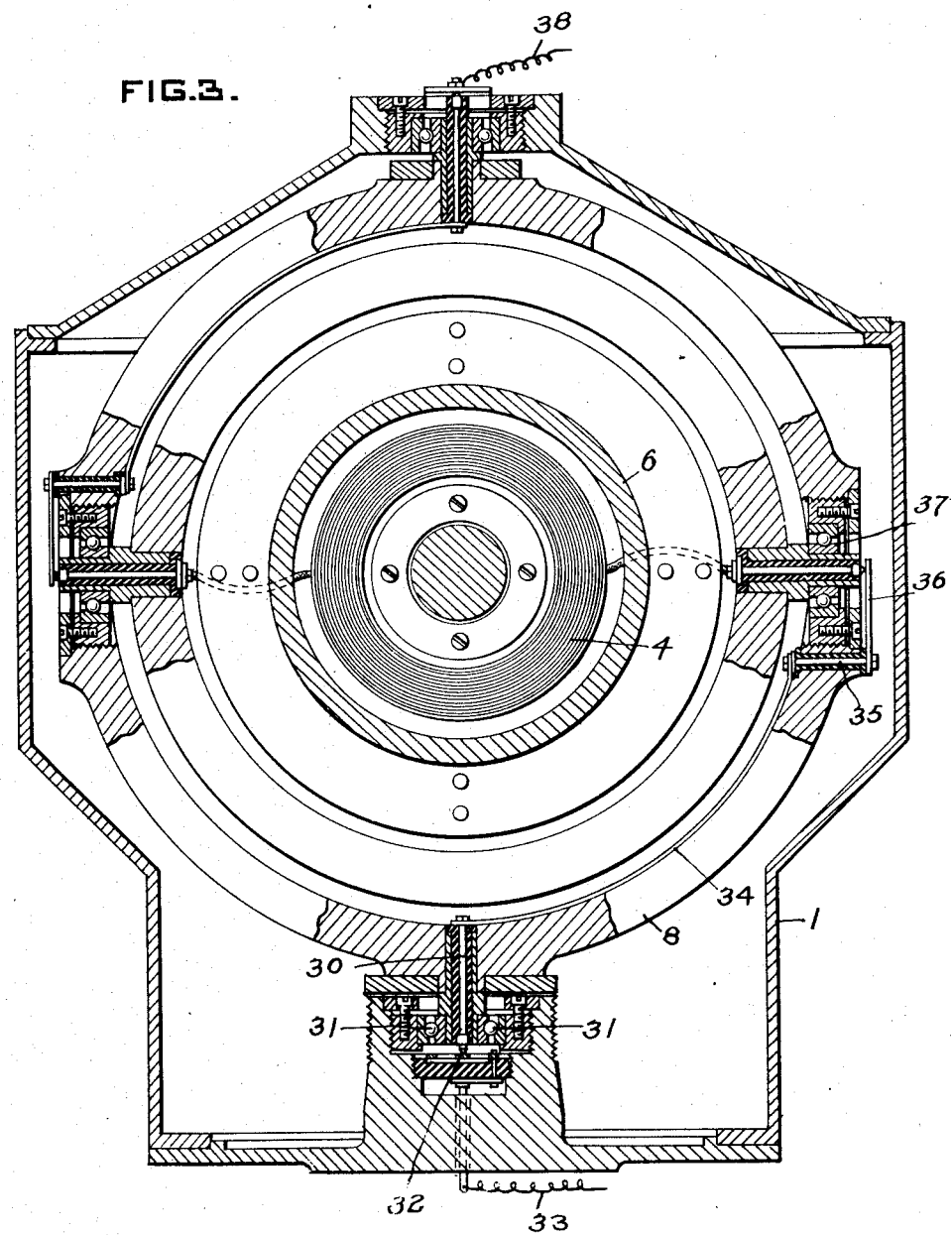

Figure 1 is a central vertical sectional view of the gyroscope mechanism, the support for the gyroscope being shown in elevation; Fig. 2 a wiring diagram for the gyroscope of Fig. 1; Fig. 3 a sectional view to enlarged scale taken on the line III—III, Fig. 1; Fig. 4 a detail sectional view taken on the line IV—IV, Fig. 1; Fig. 5 a sectional view to enlarged scale of a detail of construction; Fig. 6 a face view of a contactor; and Fig. 7 a diagrammatic representation of my invention as applied to an automobile aeroplane.

The gyroscope shown herein is contained within a suitable housing 1 mounted upon a support 2, to which there is also connected a servo-motor 3 adapted to be operated by the movement of the gyroscope relatively to the support. It will, however, be understood that the gyroscope may be used for other purposes than operating such a motor or equivalent controlling mechanism. As far as some features of my invention are concerned, various types of electric motors may be used in the gyroscopic construction. However, for reasons which will appear hereinafter, I preferably employ a polyphase induction motor comprising a stator 4 secured to the inner gimbal 5, and a rotor 6 pivotally mounted in such gimbal. As will be seen, the rotor preferably comprises a shaft portion extending centrally through the inductor or stator 4, and a suitable rim portion surrounding the inductor. Furthermore, to the end that there may be a minimum resistance to the rotor, the gimbal 5 is preferably an air tight housing from which the air may be exhausted through a suitable check valve 7. As is usual in such gyroscope mechanisms as are contemplated by my invention, the inner gimbal 5 is pivotally mounted in an outer gimbal 8, which in turn is pivotally mounted in the housing 1, ball or other suitable rotatable bearings being preferably employed at the several pivot points.

When gyroscopes are used for controlling torpedoes, automobile aeroplane, etc., it is desirable, and in some instances necessary, to quickly spin them to a high velocity; and to thus spin an electric motor gyroscope it is necessary to use such a heavy initial current that, if caused to flow through the gimbal bearings, there is great liability of their being seriously injured if not entirely destroyed. To overcome this difficulty I provide means for carrying the current to the electric motor by conductors borne by a gimbal, and furthermore, I provide means for locking the gyroscope during the spinning thereof and for subsequently unlocking it and breaking the electric spinning circuit.

The preferred construction for this purpose is illustrated in the drawings, wherein there is shown a single slide member 9 for locking the gyroscope and making and breaking the circuit. The particular motor shown herein is a three phase induction motor. From the stator 4 there extend three conductors 10 (two of which appear in Fig. 1) to contact sleeves 11 borne by the gimbal 5. In positions to telescope with these sleeves, the slide member 9 is provided with insulated conducting tubes 12, which in turn telescope with conducting rods 13 secured to a disk 14 mounted within a casing 15, which casing incloses the slide member. As will be readily understood, the rods 13 are electrically connected to the supply conductors 16 leading from a suitable generator 50. The gimbal or housing 5 is also provided with a pocket 17 adapted to receive a locking pin 18 borne centrally by the slide member 9.

For moving the slide member 9 to make and break circuits through the motor and to lock the gyroscope, such member is, as shown particularly in Figs. 1 and 4, preferably provided with a rack face 19 adapted to be engaged by a pinion 20 secured to a shaft 21, which shaft, through pinions 22 and 23 may be rotated by the turning of a shaft 24. Preferably two instrumentalities are provided for turning the shaft 24, one for effecting the forward circuit-closing and locking movement of the slide member, and the other for effecting the rearward circuit-breaking and unlocking movement thereof. For the former there is shown a rod 25 provided with a bevel pinion 26, which meshes with a like pinion 27 secured to the shaft 24, such rod having formed at its upper end a wrench cup 28. For the latter, that is the rearward movement of the slide member, the pinion 23 is provided with an operating handle or lever 29.

The operation of the gyroscope as thus far explained is readily apparent from the foregoing description. The gyroscope and the slide member 9 being in the positions indicated in Fig. 1, a strong electric current may be caused to flow through the stator 4 to effect a quick spinning of the rotor, the electrical contacts and conductors for such current being in every respect adequate for the purpose and so disposed as to eliminate all liability of injuring the delicately adjusted gyroscope bearings, or to cause the gyroscope to precess after having been unlocked.

My invention further contemplates the provision of practical means for causing an electric motor gyroscope to continue to spin indefinitely after it is unlocked, the gyroscope construction and the arrangement of electrical connections therefor being such that the gyroscope is in every respect as free to move as if rotating only under an initial spinning impulse. The instrumentalities which I provide for the purpose may be used as the sole spinning means of gyroscopes used for purposes not requiring a quick spinning of the rotor, but wherein such spinning may be effected gradually by means of a relatively light current. However, in the present embodiment of my invention I have shown the continued spinning means as being coördinated with, and for the most part adapted to act subsequently to, the initial spinning means already described.

For effecting the continued spinning of the gyroscope I lead a relatively light current to the motor (in this case the stator 4) through conductors carried by the gimbals and having outer contact faces lying, in each instance, in the pivot axis of the gimbal to which it is secured, there being conductors or contactors adapted to bear upon such faces for completing the circuit. My preferred construction for this purpose is illustrated in Fig. 5, which is an enlarged detail view of the lower pivot point of the outer gimbal 8. As there shown, I provide the gimbal with an insulated conductor rod 30, lying within the bearing area of the pivot point of the gimbal (in this instance within the ball bearings 31), and having a pointed outer end or face which lies in the axis of the pivot. Against this contact face there bears the end of a delicate contactor in the form of a spring 32, shown particularly in Fig. 6, such contactor being electrically connected to a supply conductor 33. It will be observed of this construction that, while desirable, it is not essential that the body of the rod 20 lie in the pivotal axis, it being only necessary that the contact end thereof be thus disposed. As is readily apparent, the arrangement is such that the gimbal 8 is free to turn without retardation or mechanical resistance due to the electrical connection, and furthermore there is afforded an adequate electrical connection for a relatively light spinning current.

As shown particularly in Fig. 3, the electrical connection just described may be used at each pivot point of the two gimbals. Briefly described, the conductor rod 31 is, by means of a conductor 34 and a binding post 35, electrically connected to a spring contactor 36, which bears upon the axial contact face of a conducting rod 37 borne by the inner gimbal 5, such rod 37 being electrically connected to the stator 4; and in the same manner a second conductor 38 is electrically connected to such stator, the arrangement being clearly shown in Fig. 3, and needing no further explanation.

The coördination of the two above described spinning means, or means for carrying currents to the motor, will of course depend upon the type of motor employed. In the present embodiment of my invention a three phase motor is shown, and the connections for the continued spinning of the rotor are made through but one of the phase windings of the stator. This is diagrammatically illustrated in Fig. 2 wherein the slide member 9 is electrically connected to the supply conductors 16, the gimbal contactors 11 to the three phase windings, and the supply conductors 33 and 38 to one of the phase windings. To the end that a current of sufficient strength to injure the contact faces of the conductor rods 30 and 37 and the contactors 32 and 36 may not, when the initial spinning is being effected, flow through the conductors 33 and 38, such conductors or parts of their circuit are preferably of less current carrying capacity than the conductors 10 and the several contactors and conductors in circuit therewith. However, this precaution need not be observed in case the conductors 33 and 38 are not, in effect shunts of two of the conductors 16, for it is well understood that the induced currents, consequent upon the spinning of the rotor, will then prevent heavy currents from flowing through the delicate spring contacts.

As already stated, the gyroscope which I provide may be used for various specific purposes. Its adaptability to control torpedoes will be readily understood from a consideration of the disclosure of my aforementioned application Serial No. 18,962. In Fig. 7 I have diagrammatically illustrated its adaptability to guide or control an automobile aeroplane. As there shown the gyroscope, indicated at 40, is arranged to control a servo-motor 41, which, through suitable levers 42 and cords 43, operates the rudder 44. The current for spinning the gyroscope is generated by a generator 45 having suitable driving connections with the propeller engine 46, such current being carried to the gyroscope through conductors 47.

The operation of the gyroscope, in the form illustrated herein, and irrespective of any specific use thereof, is as follows: The gyroscope, after being brought to the proper position, is locked by moving forwardly the slide member 9, and, in such position of the slide member, circuits are closed through the stator 4. A heavy current may then be caused to flow through the conductors 16, rods 13, sleeves 12, contactors 11 and conductors 10 to the stator 4 to quickly spin the rotor 6 to the proper or required speed. Thereafter, the slide member 9 may be moved rearwardly to unlock the gyroscope and to break the electric circuit just described, and the continued spinning of the rotor will be prolonged at will by a lighter current carried through the conductors 33 and 38, contactor 32, rods 30 and the several illustrated connections from such rods to the stator.

I have already stated that my present application is a continuation in part of my pending application Serial No. 18,962. In said application there is disclosed all of the subject matter of my present case except the means for effecting the continued spinning of the gyroscope after it has been unlocked.

I claim as my invention:

1. An electric motor gyroscope comprising gimbal rings, a stator and a rotor; contactors borne by a gimbal and electrically connected to said stator, and a member movable to and from such contactors for making and breaking a circuit through them.

2. An electric motor gyroscope comprising gimbals and motor elements, contactors carried by one of said gimbals and electrically connected to a motor element, a slide member provided with conductors adapted to contact with said contactors, and means for moving said slide member.

3. An electric motor gyroscope comprising gimbal rings, and an electric motor suspended therein, in combination with a single movable member for locking the gyroscope and for making and breaking an electric circuit through the motor thereof.

4. An electric motor gyroscope comprising gimbals and motor elements, contactors borne by one of said gimbals and electrically connected to a motor element, and a movable member provided with a centering pin adapted to engage and lock said contactor-provided gimbal and further provided with electrical conductors adapted to contact with said contactors.

5. An electric motor gyroscope comprising in part a gimbal and a non-rotatable inductor, contactors carried by said gimbal and electrically connected to the inductors, and a slide member provided with electrical conductors adapted to contact with said gyroscope contactors, said slide member being further provided with a centering pin for locking the gyroscope.

6. An electric motor gyroscope comprising gimbal rings and motor elements supported therein, contactors carried by one of said gimbals and electrically connected to a motor element, and a second electric circuit through the pivot points of said gimbals to said motor element.

7. An electric motor gyroscope comprising gimbal rings and motor elements supported therein, contactors carried by one of said gimbals and electrically connected to a motor element, and a supplementary electric circuit through the pivot points of said gimbals to said motor elements, said supplementary circuit being of less electrical capacity than said circuit including the gimbal contactors.

8. An electric motor gyroscope comprising gimbal rings and a polyphase induction motor including a rotor and a stator supported within said gimbals, contactors borne by one of said gimbals and electrically connected to said stator, and a second electric circuit through the pivot points of said gimbals and but a portion of said stator.

9. An electric motor gyroscope comprising gimbals and a stator and a rotor supported therein, contactors carried by one of said gimbals and electrically connected to said stator, means for making and breaking a circuit through said contactors to effect the initial spinning of said stator, and a second electric circuit through the pivot points of said gimbals to said stator and adapted to supply current for the continued rotation of said rotor.

10. An electric motor gyroscope comprising gimbal rings and a polyphase induction motor including a rotor and stator supported within said gimbals, contactors borne by one of said gimbals and electrically connected to said stator, a member provided with electrical conductors and movable to make and break a circuit through said contactors, and a second electric circuit through the pivot points of said gimbals and but a portion of said stator.

11. An electric motor gyroscope comprising gimbals and a polyphase induction motor including a motor and a stator supported within said gimbals, said stator constituting the inductor of the motor and secured to one of said gimbals, contactors borne by one of said gimbals and electrically connected to the several phase winding of said inductor, a movable member provided with conductors adapted to make and break contact with said gimbal contactors, said conductors being electrically connected to a polyphase generator, and a second electric circuit through the pivot points of said gimbals and but a portion of the several phase windings of said inductor, said second circuit being of less current-carrying capacity than the circuit through said gimbal contactors and being electrically connected with said generator.

12. An electric motor gyroscope comprising pivotally mounted gimbals and motor elements supported therein, an electrical conductor borne by a gimbal at its pivot point and having an outer point contact lying in the pivotal axis of said gimbal, said conductor being electrically connected to one of said motor elements, and a yielding contactor adapted to contact with the contact face of said gimbal conductor.

13. An electric motor gyroscope comprising pivotally mounted gimbals and motor elements supported therein, an electrical conductor borne by a gimbal at its pivot point and disposed within and extending through the bearing area of such point, said conductor having an outer point contact lying in the pivot axis of said gimbal and being electrically connected to one of said motor elements, and a spring contactor adapted to contact with the contact face of said gimbal conductor.

14. An electric motor gyroscope comprising gimbals and an induction motor including rotor and stator supported within the gimbals, said stator constituting the inductor of the motor and being secured to the inner gimbal, electrical conductors borne by a gimbal at its pivot point and having an outer contact face lying in the pivotal axis of said gimbal, said conductor being electrically connected to said stator, and a contactor adapted to contact with said contact face of said gimbal conductor.

15. An electric motor gyroscope comprising gimbals and an induction motor including rotor and stator supported within the gimbals, said stator constituting the inductor of the motor and being secured to the inner gimbal, electrical conductors borne by said gimbals at their pivot points and disposed within and extending through the bearing area of such points, said conductors being electrically connected with said stator and each having at its outer end a contact face lying in the pivot axis of the gimbal to which it is secured, and contactors adapted to contact with said contact faces of said gimbal conductors.

16. An electric motor gyroscope comprising gimbals and an induction motor including rotor and stator supported within the gimbals, said stator constituting the inductor of the motor and being secured to the inner gimbal, electrical conductors borne by said gimbals at their pivot points and disposed within and extending through the bearing area of such points, said conductors being electrically connected with said stator and each having at its outer end a point contact lying in the pivoted axis of the gimbal to which it is secured, and spring contactors adapted to contact with said point contacts of said gimbal conductors.

In testimony whereof I have hereunto set my hand.

HAROLD W. SHONNARD.

Witnesses:
R. MATTHEWS,
VICTOR LA FAYE.

Copies of this patent may be obtained for five cents each, by addressing the "Commissioner of Patents, Washington, D. C."